(12) United States Patent
Preckel et al.

(10) Patent No.: US 8,978,552 B2
(45) Date of Patent: Mar. 17, 2015

(54) DEVICE FOR TREATING PACKAGING MEANS

(75) Inventors: Katrin Preckel, Gelsenkirchen (DE); Manfred Pschichholz, Kamen (DE); Frank Putzer, Hamburg (DE); Markus Reiniger, Mönchengladbach (DE); Martin Schach, Bochum (DE); Winfried Schlüter, Horstmar (DE); Werner Vande Wynckel, Wolvertem (BE)

(73) Assignee: KHS GmbH, Dortmund (DE)

( * ) Notice: Subject to any disclaimer, the term of this patent is extended or adjusted under 35 U.S.C. 154(b) by 585 days.

(21) Appl. No.: 13/147,281

(22) PCT Filed: Sep. 7, 2010

(86) PCT No.: PCT/EP2010/005478
§ 371 (c)(1), (2), (4) Date: Sep. 7, 2011

(87) PCT Pub. No.: WO2011/038827
PCT Pub. Date: Apr. 7, 2011

(65) Prior Publication Data
US 2012/0011807 A1 Jan. 19, 2012

(30) Foreign Application Priority Data
Sep. 30, 2009 (DE) .......................... 10 2009 043 497

(51) Int. Cl.
| | |
|---|---|
| *A01H 5/02* | (2006.01) |
| *B65G 37/00* | (2006.01) |
| *B41F 17/00* | (2006.01) |
| *B65B 61/02* | (2006.01) |
| *B41J 3/407* | (2006.01) |
| *B65G 29/00* | (2006.01) |

(52) U.S. Cl.
CPC ............. *B65B 61/025* (2013.01); *B41J 3/4073* (2013.01); *B65G 29/00* (2013.01); *B65G 2201/0261* (2013.01)
USPC ... 101/171; 198/478.1; 198/379; 198/377.01; 101/35; 101/37; 101/39

(58) Field of Classification Search
CPC .......... B41F 17/08; B41F 17/18; B41F 17/28; B41F 17/30; B65G 1/0157; B65G 2201/0247; B65G 2201/0244; B65G 51/035
USPC ......... 101/171, 74, 35, 36, 37, 39; 198/478.1, 198/471.1, 468.4, 468.2, 379, 867.02, 198/474.1, 466.1, 377.01
See application file for complete search history.

(56) References Cited

U.S. PATENT DOCUMENTS 5,031,749 A * 7/1991 McCoy ...................... 198/408
5,769,476 A * 6/1998 Lawn et al. .................. 294/99.1
(Continued)

FOREIGN PATENT DOCUMENTS

| DE | 19927668 | 12/2000 |
|---|---|---|
| DE | 10100211 | 7/2002 |

(Continued)

*Primary Examiner* — Matthew G Marini
(74) *Attorney, Agent, or Firm* — Occhiuti & Rohlicek LLP

(57) ABSTRACT

The invention relates to a device for treating packaging means, such as bottles, cans or similar containers, comprising a device-internal transport section, on which the treatment of the packaging means is carried out on processing stations (8) in at least two process steps, and further comprising holding and centering elements, by means of which the packaging means (1) are held at least during the respective process step in an orientation on the device-internal transport system necessary for said process step and/or by means of which the packaging means are moved at least during one process step.

23 Claims, 12 Drawing Sheets

(56) References Cited

Figure 10:
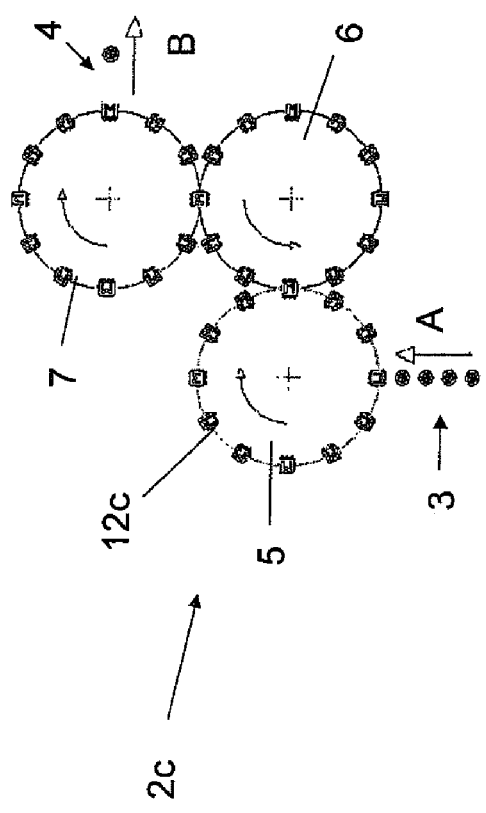

U.S. PATENT DOCUMENTS 6,668,517 B2 * 12/2003 Hiramoto et al. ............ 53/133.2
6,669,010 B1 * 12/2003 Venturato et al. ........ 198/867.09
2004/0011626 A1 * 1/2004 Hiramoto et al. .......... 198/478.1

FOREIGN PATENT DOCUMENTS

| DE | 102007050490 | 4/2009 |
|----|--------------|--------|
| WO | 2004/00936 | 12/2003 |

* cited by examiner

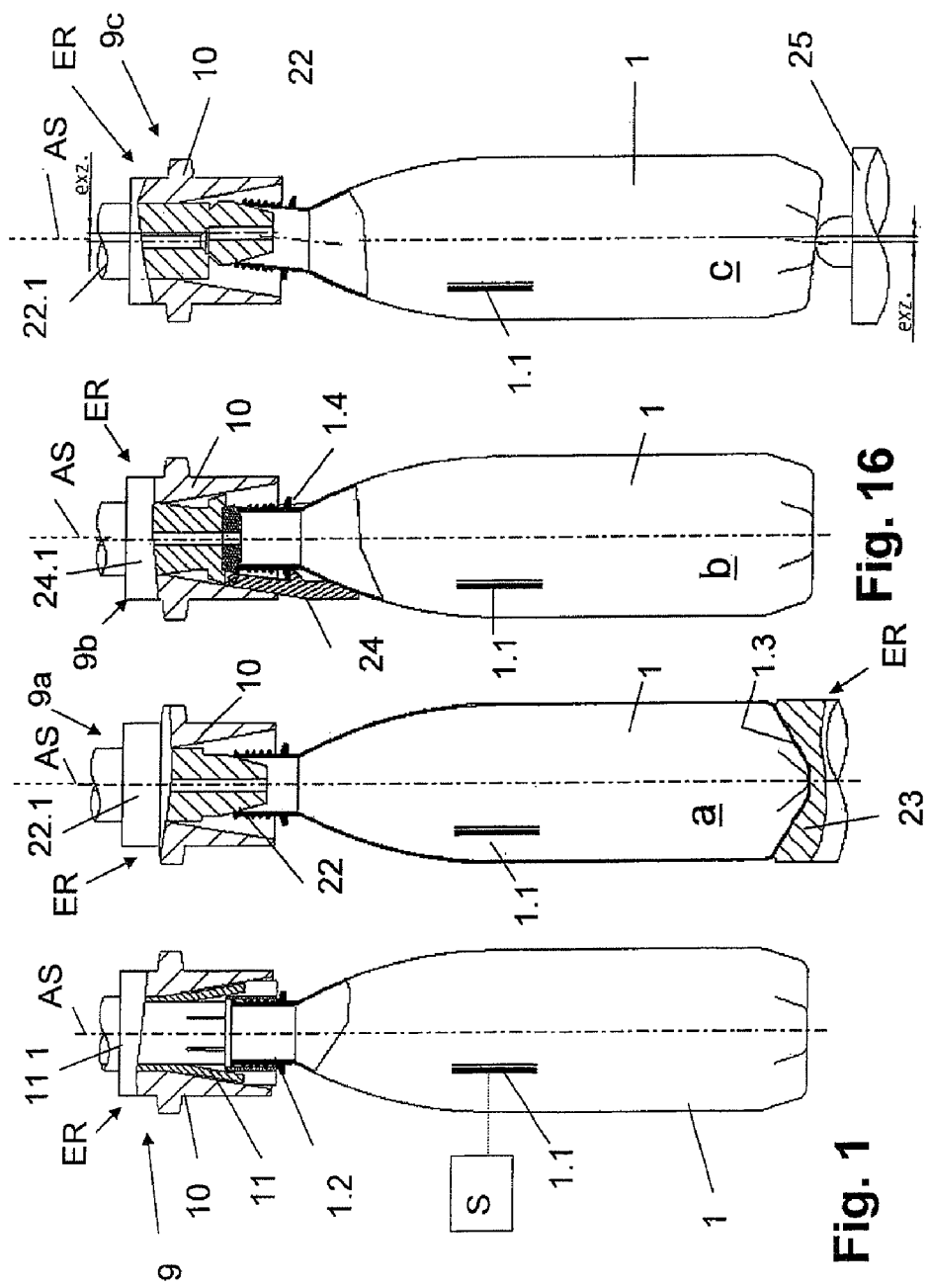

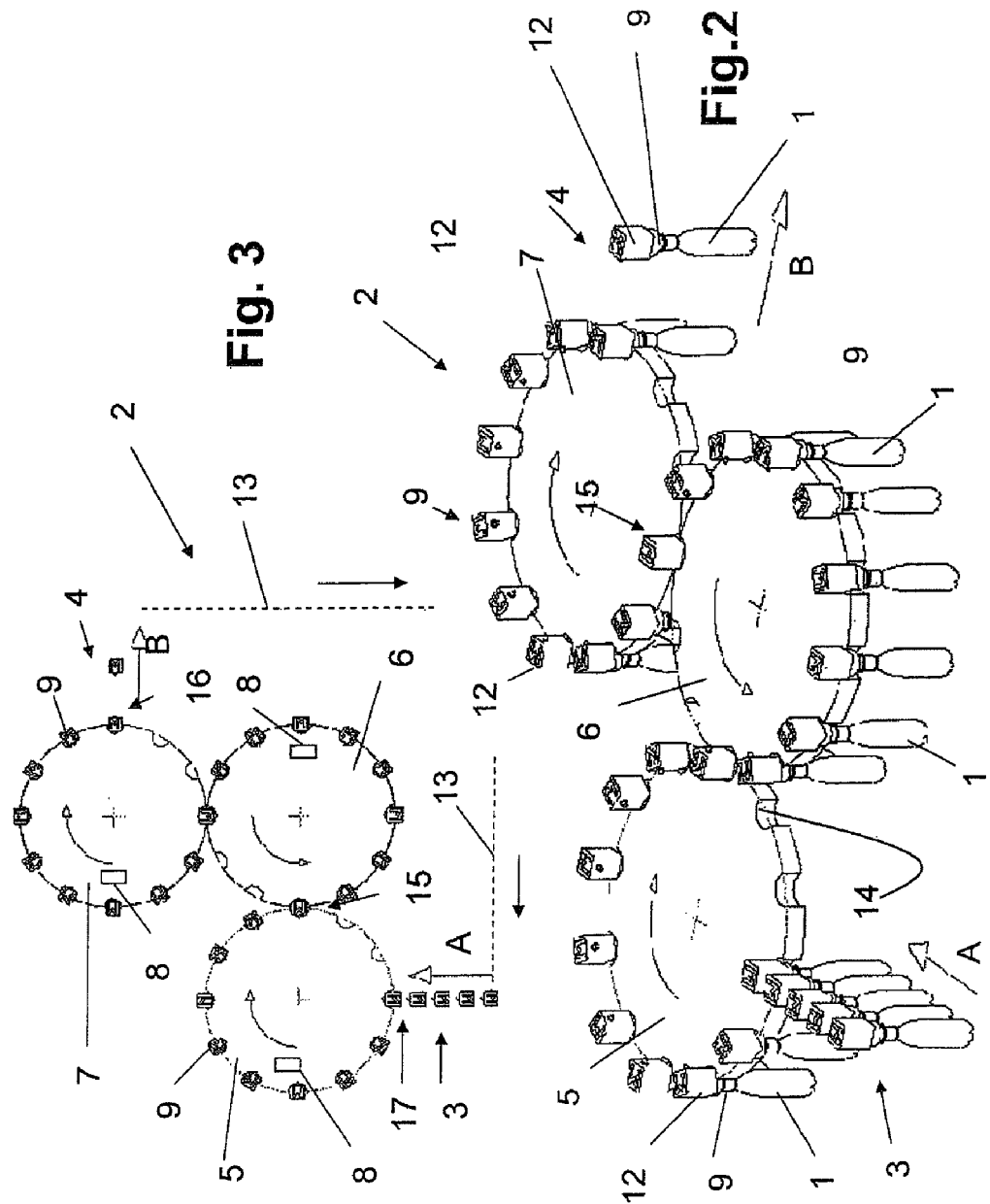

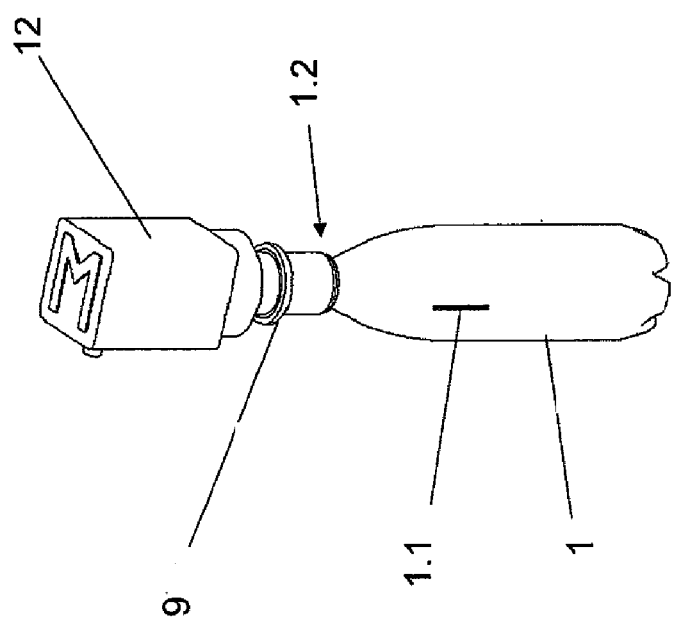

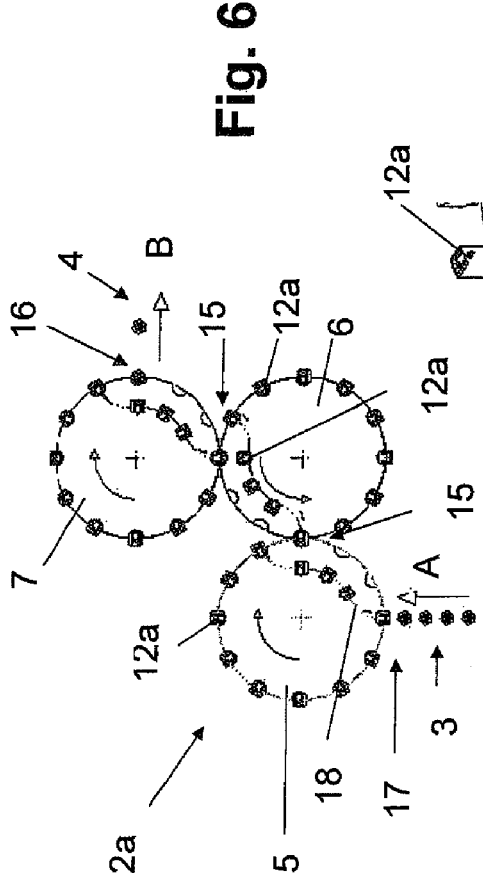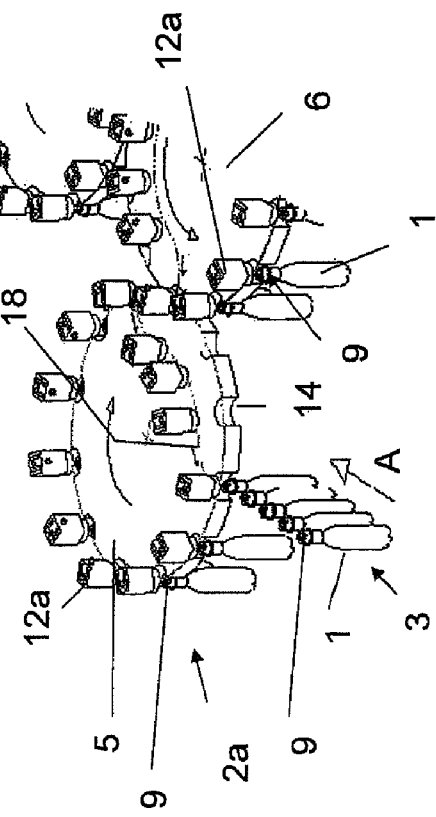

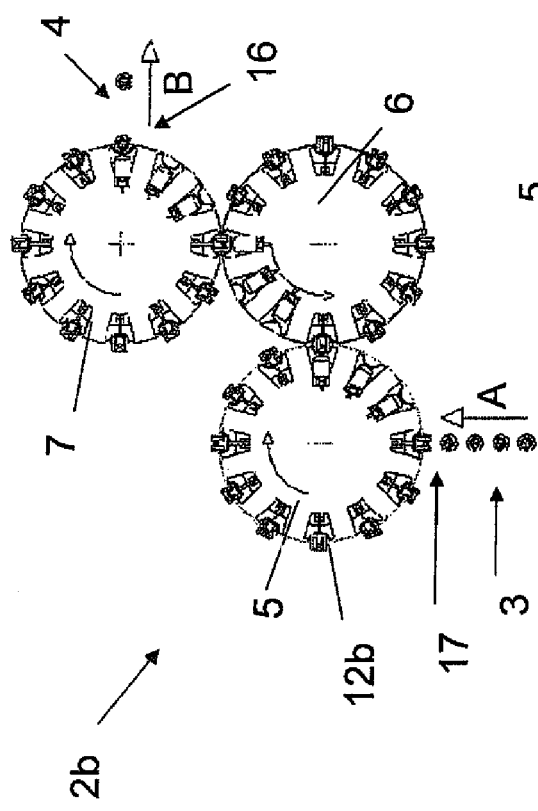
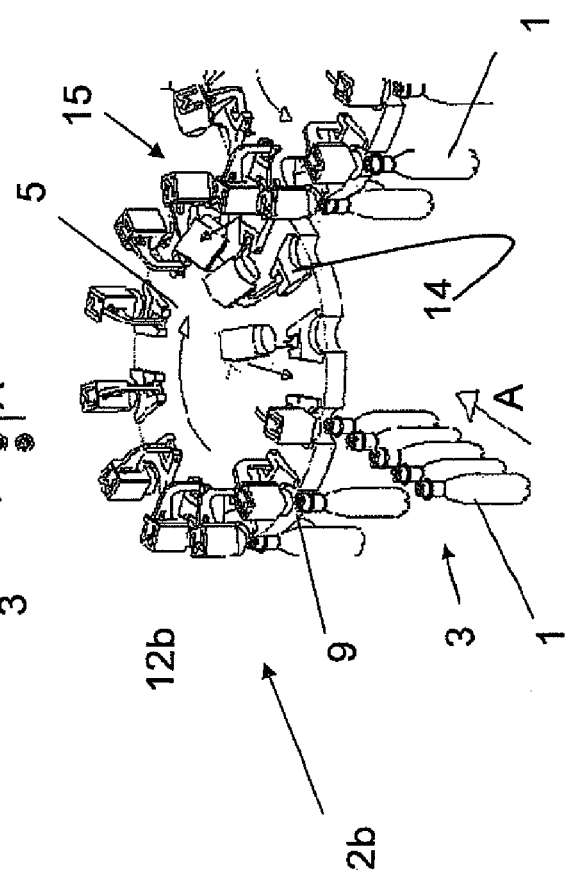

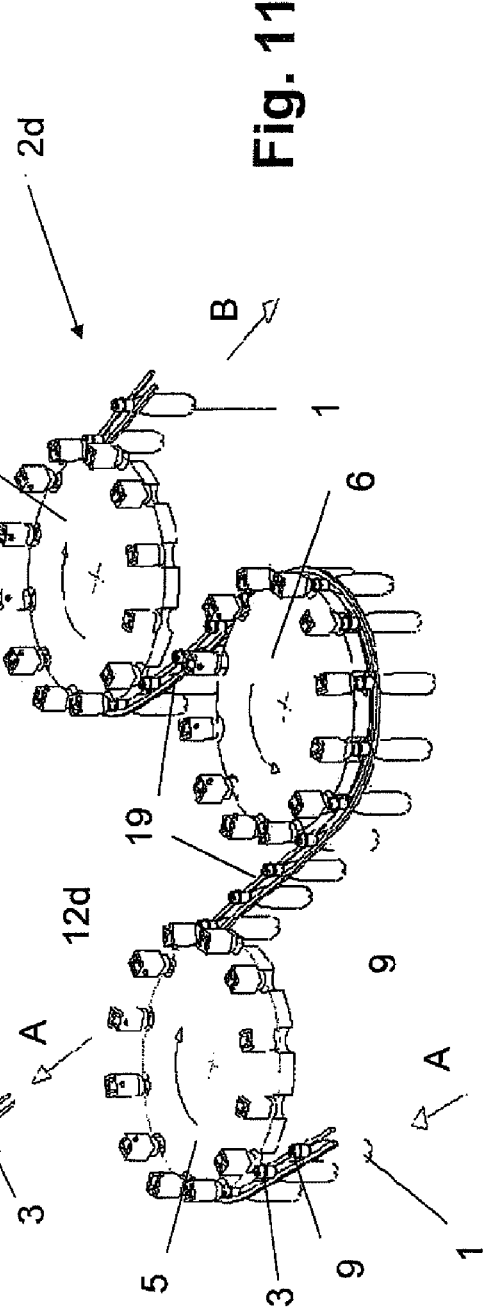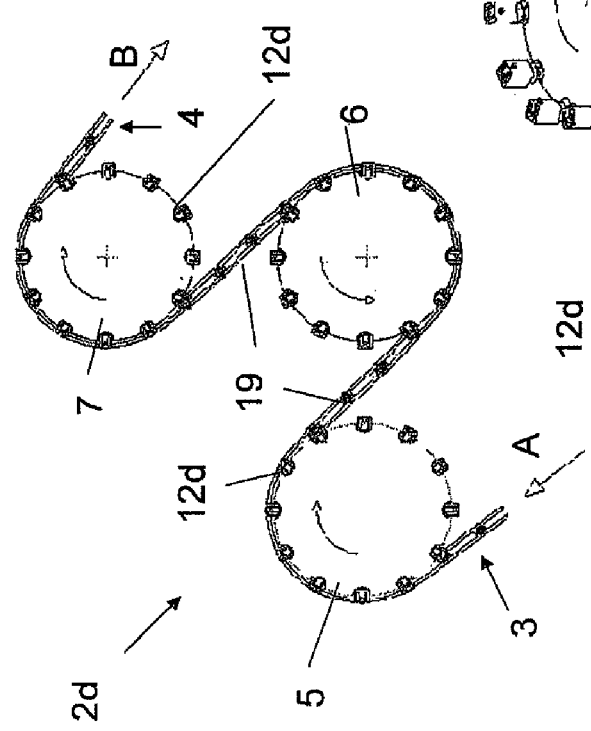

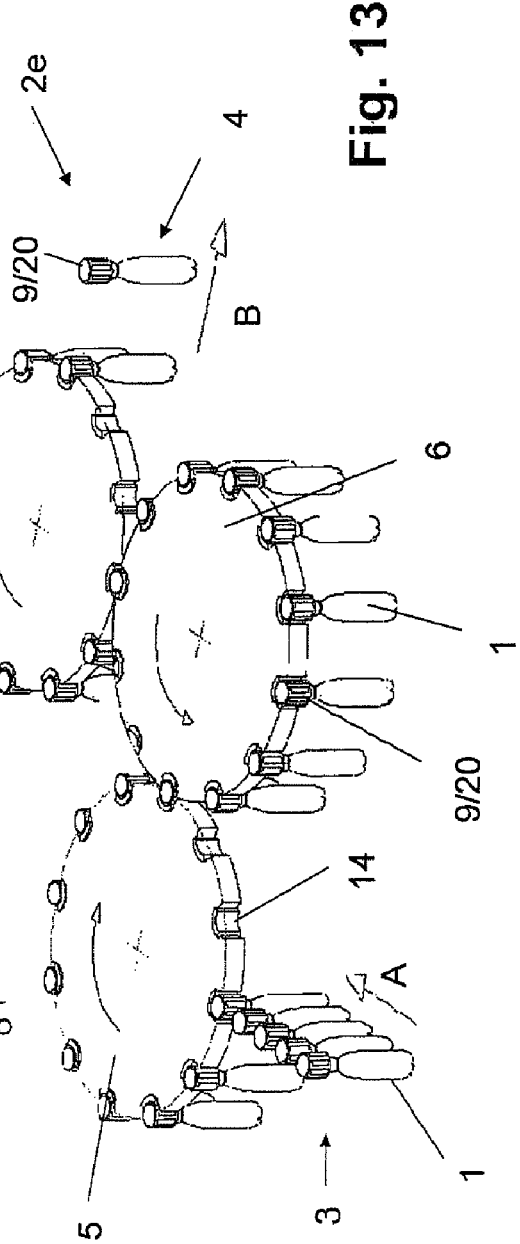
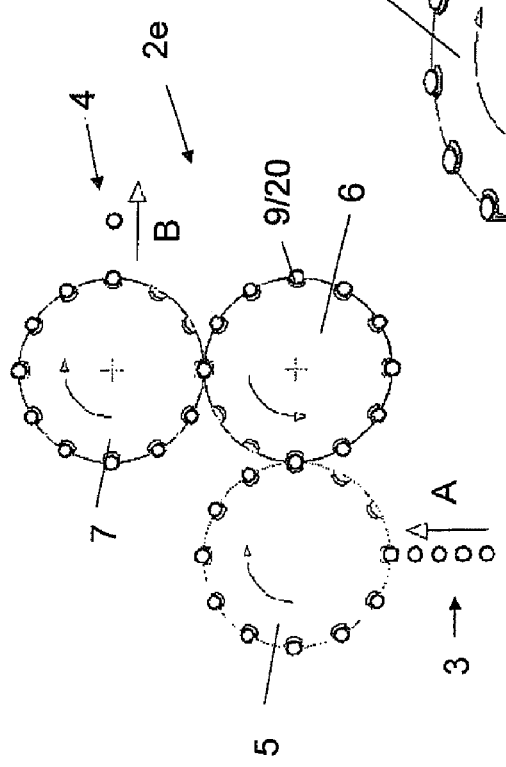

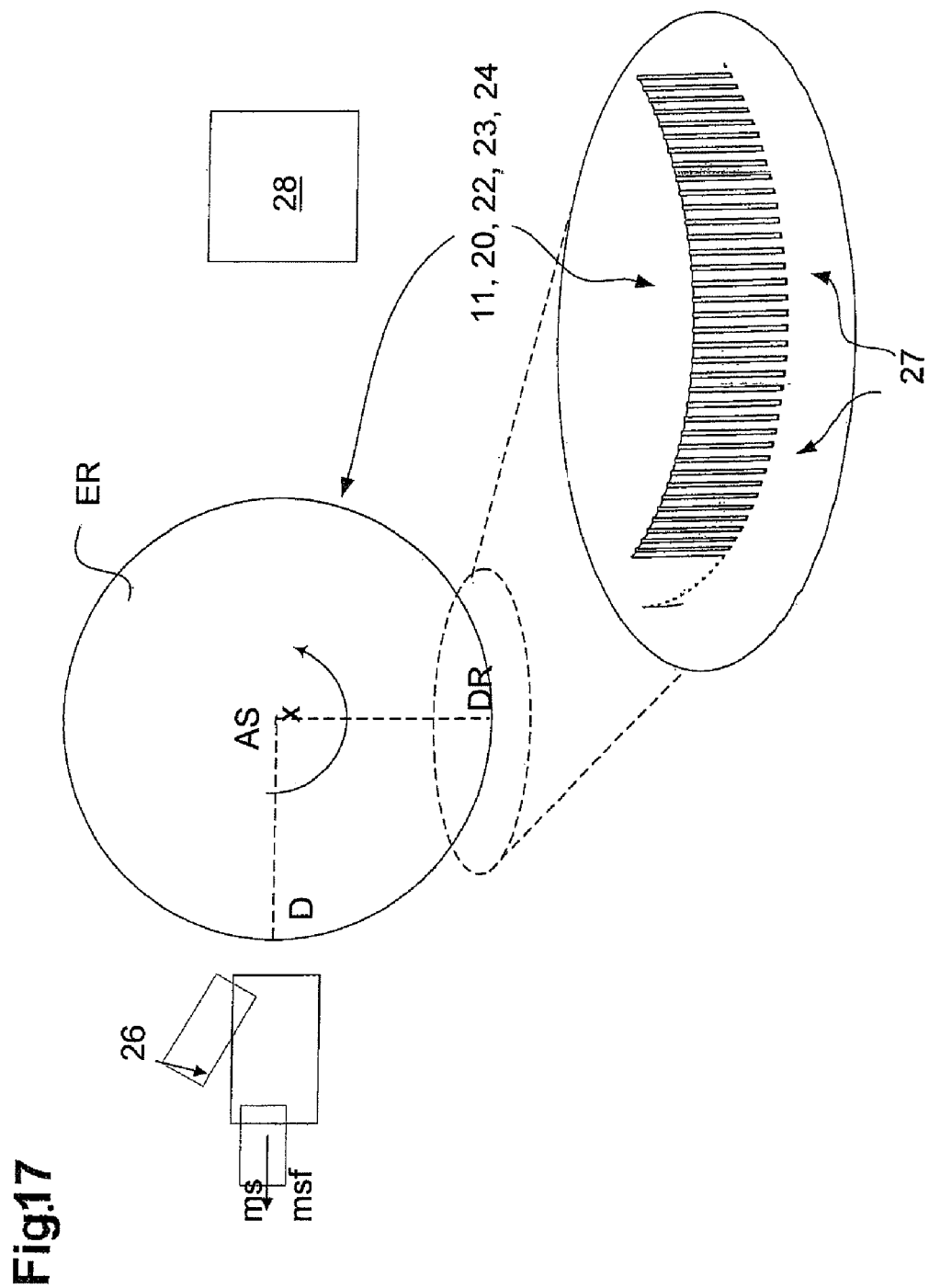

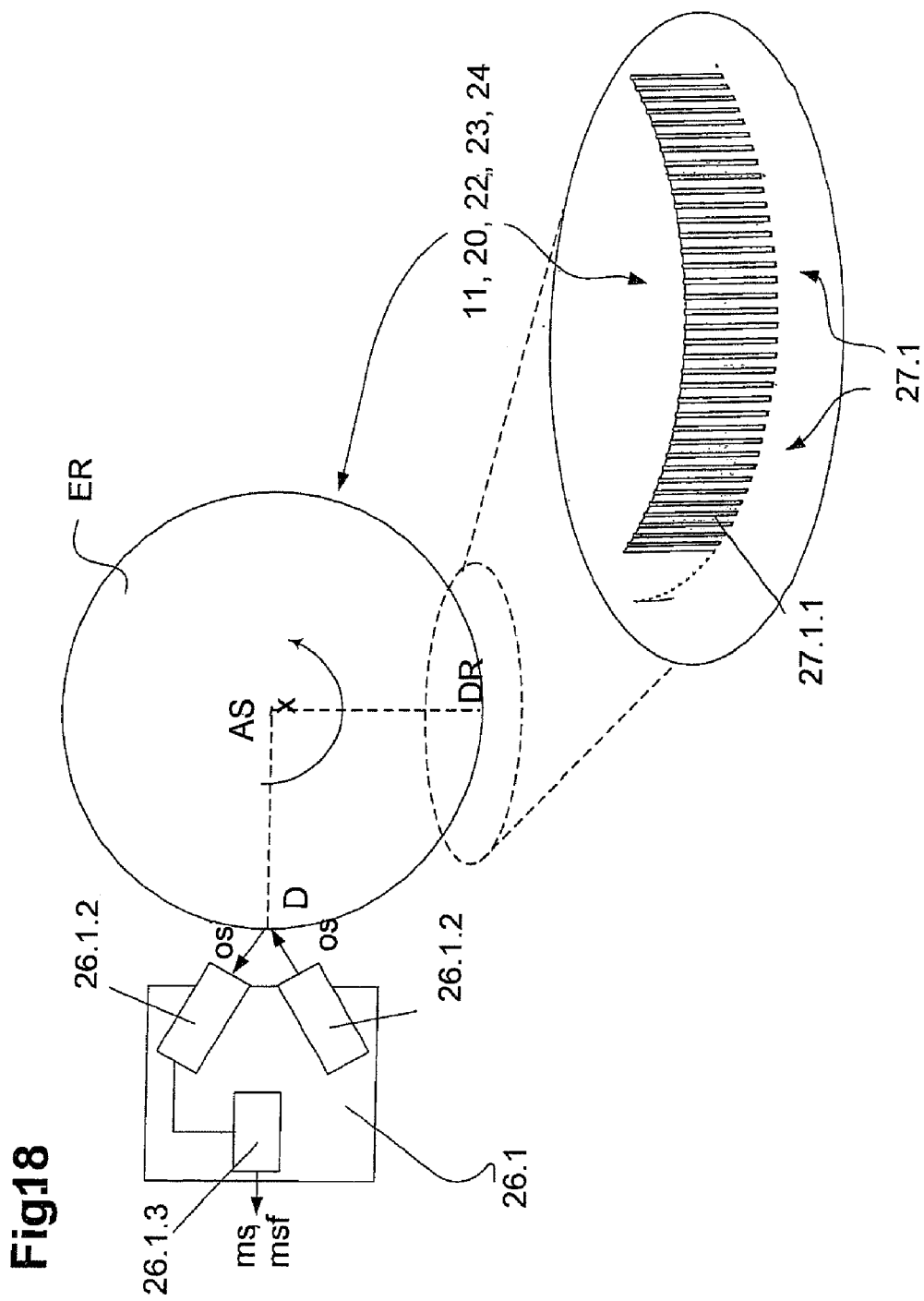

DEVICE FOR TREATING PACKAGING MEANS

CROSS-REFERENCE TO RELATED APPLICATIONS

This application is the National Stage of International Application No. PCT/EP2010/005478, filed on Sep. 7, 2010, which claims the benefit of the priority date of German Patent Application No. 10 2009 043 497.6, filed on Sep. 30, 2009. The contents of both applications are hereby incorporated by reference in their entirety.

The invention relates to a device for treating packaging means such as bottles, cans or similar containers in a process comprising several work steps, according to the preamble of claim 1, and in particular a device for printing packaging means.

The subject of an older patent application DE . . . not previously published is a device for applying a multicolour print to packaging means, in which (device) the packaging means, for printing on a device-internal transport system, moves past several printing stations or printing machines or printing heads at each of which a colour set of the multicolour print is applied. The device-internal transport system of the device is formed by several rotor or transport star-like transport elements arranged in succession in the transport device, each of which can be driven circulating about a vertical axis and on which elements the printing heads are provided. Printing takes place by rotating the packaging means about its axis out of a pre-specified starting position. The packaging means are here held on the transport element on holding and centering elements and aligned with these units such that each packaging means has the orientation or alignment (including neutral position) necessary for precise application of the colour set concerned in relation to the printing head concerned so that after application of all colour sets, a high quality multicolour print is achieved. The holding and centering elements are part of the transport element concerned i.e. the packaging means, at transition areas at which the transport elements adjoin each other, are transferred from one holding and centering unit of the preceding transport element in the transport direction to a holding and centering unit of the next transport element in the transport direction. This is complex at least in the design and the control system, but means that the centering and alignment assumed at a transport element for the packaging means concerned is lost on transfer i.e. after transfer, further centering and alignment are required. The alignment of the packaging means takes place for example by manual centering and using sensors which detect markings or reference features present on the packaging means, wherein these reference features or markings are for example optical, electronic or magnetic. The realignment of the packaging means required at each transport element takes additional time and can therefore lead to a substantial reduction in performance of the device (number of packaging means processed per time unit).

The object of the invention is to specify a device which allows, with reduced control complexity, the treatment of packaging means such as bottles, cans or similar containers in one work process which takes place in several temporally separated work steps on at least two transport elements forming a device-internal transport system and succeeding each other in the transport direction of this transport system, with increased performance and precisely aligned packaging means. This object is achieved by a device according to claim 1.

Packaging means in the sense of the invention are in particular bottles, cans or similar containers. Multiple printing in the sense of the invention generally means printing generated with several printed images or print sets, preferably multicolour printing of several colour sets of different colours, for example yellow, magenta, cyan and black.

One feature of the device according to the invention is that the individual clamping or holding and centering elements are not part of the transport element but are function elements independent of these transport elements, so that despite the formation of the device-internal transport system with several autonomous transport elements in succession in the transport direction, each packaging means throughout the entire process is held on one and the same holding and centering unit, i.e. these units are passed with the packaging means concerned from one transport element to the next transport element in the transport direction.

The individual holding and centering elements are for example firmly connected for drive with an electric servomotor or at least with a function element, for example with a rotor of such a servomotor, or are provided on the transport element with these servomotors which also travel, which after delivery of the respective holding and centering unit are coupled to said unit so that with the servomotors, an alignment of the packaging means or neutral position and/or rotation of the packaging means about their axis can take place on printing.

Refinements, advantages and possible applications of the invention arise from the description of embodiment examples and from the figures. All features shown in the figures and/or described, alone or in any combination, are in principle the subject of the invention irrespective of their summary in the claims or back references. The content of the claims is also part of the description.

Figure 15:
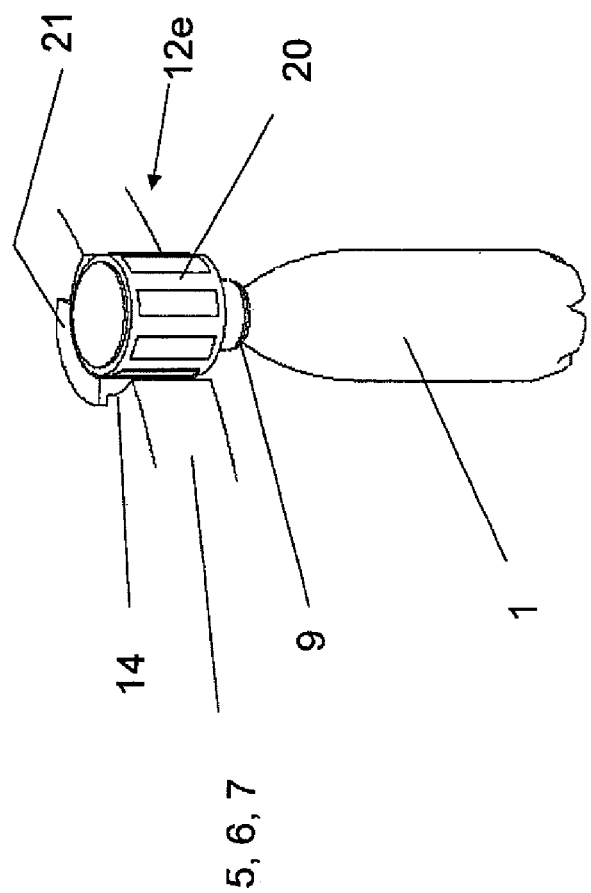
Figure 19:
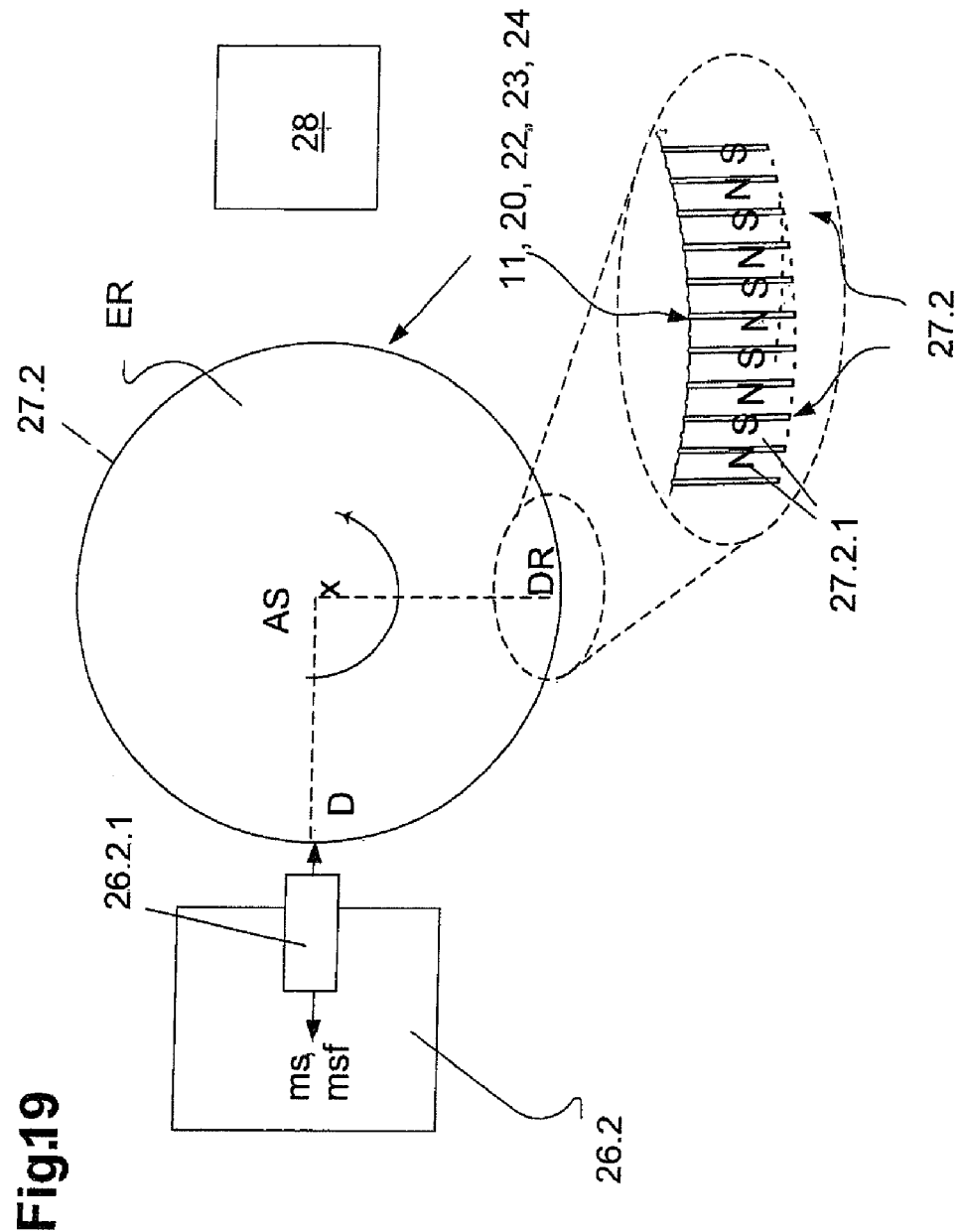

The invention is explained in more detail below with reference to the figures showing embodiment examples. These show:

FIG. 1 in simplified view and in side view, a clamping or holding or centering unit (often also called a puck) together with a packaging means in the form of a bottle held suspended therefrom;

FIGS. 2 and 3 in a diagrammatic functional depiction, a device for treating packaging means or bottles in perspective view and in top view;

FIG. 4 in simplified perspective view, the bottle held suspended from the clamping or holding and centering unit together with its servomotor;

FIGS. 5 and 6, 7 and 8, 9 and 10, 11 and 12, 13 and 14 in views similar to FIGS. 2 and 3, further embodiments of the device according to the invention;

FIG. 15 in perspective detailed view, a clamping or holding and centering unit provided on a transport element of the devices in FIGS. 13 and 14 together with a bottle;

FIG. 16 in positions a, b, and c, further embodiments of the clamping or holding and centering unit for use in the invention, each together with a bottle;

FIGS. 17-19 in diagrammatic functional depictions, incremental emitters or sensor systems for contactless detection of rotary or angular positions and/or the rotation movement of the containers at the holding and centering elements.

In the figures, packaging means 1 are shown in the form of bottles which undergo treatment in several steps, such that each bottle 1 at the start of each treatment step has a pre-specified orientation, alignment and/or starting position relative to the machine component or treatment station used, in particular in relation to the rotary position about its bottle axis. The treatment is for example the application of a multiple print onto the outer or casing surface of the bottles 1 in several printing steps, where in each printing step e.g. a colour set of a multiple print is applied in the form of a multicolour print. Here the respective, precisely centred bottle 1 aligned in the pre-specified starting position is rotated under control out of this starting position (neutral position) about its bottle axis, in the manner necessary for printing relative to the printing machine or printing head used.

The bottles 1 are preferably equipped even before the first treatment step with a marking 1.1 that can be detected by sensors (reference point or reference mark), or are given such a marking 1.1 during the first treatment. In the treatment steps then for example the orientation and alignment of each bottle is checked using these markings detected by sensors and if necessary adjusted by motor before treatment i.e. printing under rotation of the bottle 1 about its bottle axis.

For treatment or printing of the bottles 1, for example the device 2 shown diagrammatically in FIGS. 2 and 3 is used which supplies the bottles 1 to be treated to a container inlet 3 in the direction of arrow A and from which the treated bottles 1 are taken at a container outlet 4 in the direction of arrow B. The device 2 comprises a device-internal transport or conveyor section for the bottles 1, comprising several transport elements, i.e. in the embodiment shown a total of three rotor or transport star-like transport elements 5, 6 and 7 in direct succession in the transport direction which each are driven circulating about a vertical machine axis and of which the transport element 5 is arranged at the container inlet, the transport element 7 before the container outlet and the transport element 6 between the two transport elements 5 and 7. At the transport elements 5, 6 and 7, of which transport elements 5 and 7 are driven in the same direction and transport element 6 in the opposite direction to transport elements 5 and 7, treatment takes place i.e. in the embodiment shown the printing of the bottles 1 in several process steps distributed over the transport elements. For this at transport elements 5, 6 and 7 or at processing stations circulating with these, i.e. in the embodiment shown, printing machines are provided of which in FIG. 3 one is indicated diagrammatically by 8. The printing heads 8 are for example printing heads or printing machines that can be controlled electrically or electronically e.g. print heads using the ink jet printing principle (WO 2004/00936) or also print heads working on the "tone jet principle".

For alignment and rotation of the bottles 1 during treatment, these are held suspended on a clamping or holding and centering unit 9. Each holding and centering unit 9 in the embodiment shown comprises a rotationally fixed receiver element or housing 10 and a bottle clamping element in the form of a gripper or a clamping fork 11 at which the respective bottle 1 is held by clamping at its mouth area 1.2, with its bottle axis coaxial or substantially coaxial to axis AS of the holding and centering unit 9. On the housing 10 is provided an electric servomotor 12 which is connected in drive mode with the clamping fork 11 and with which the respective bottle 1 is aligned in relation to the marking 1.1 detected by a sensor and the bottle 1 rotated about its bottle axis or about axis AS during treatment.

The feature of the device 2 is now that each bottle 1, at the container delivery 3 and before handover to the transport element 4, during the entire transport within the device 2 or within the device-internal transport system formed from transport elements 5, 6 and 7 and also at the container outlet 4, is held by one and the same holding and centering unit 9, i.e. each holding and centering unit 9 is carried with the respective bottle 1 from the container inlet 3 to the container outlet 4 and despite several transport elements 5, 6 and 7 and the division of the treatment or process steps over several transport elements 5, 6 and 7, there is no handover of the bottles 1 from one holding and centering unit to another holding and centering unit. Only at the end of the container outlet i.e. where the treated bottles 1 are passed to an external carrier not shown, is the respective bottle 1 detached from its holding and centering element 9 which is then returned to the start of the container inlet 3 for further use, i.e. to receive a further bottle 1, via a transport system 13 indicated diagrammatically in FIG. 3 with a broken line. The transport system 13 comprises for example a guide or guide rail and a transport chain or transport belt.

On their periphery, transport elements 5, 6 and 7 form receivers 14, at each of which is provided a printing head 8 and at which the holding and centering elements 9 can dock with their housing 10 in a pre-specified direction and orientation including in relation to the respective transport elements 5, 6 or 7 so that each bottle 1 held suspended on a docked holding and centering unit 9 retains the defined orientation even after handover from transport element 5 to transport element 6 or from transport element 6 to transport element 7. The receivers 14 are provided at such a spacing interval on the periphery of transport elements 5, 6 and 7 that with synchronously driven transport elements 5, 6 and 7, whenever a receiver 14 has reached the handover position 15 between two transport elements 5, 6 or 7, a receiver 14 of the subsequent transport element is present there and thus each holding and centering unit 9 together with the bottle 1 held at this is delivered directly from transport element 5 to transport element 6 or from transport 6 to transport element 7 while retaining its alignment and orientation and hence while retaining the alignment and orientation of the bottle 1.

In a simple variant the bottle 1 is pre-positioned only at each preceding transport element for the next transport element. The angular signal is moved for example approximately 5° before the next encoder. After delivery of the bottle 1 this is again brought into rotation and the encoder ring passes on the actual position.

The essential aspect of the device according to the invention lies in that the sensor unit is formed for contactless detection of the rotary position of the rotary device. Due to the contactless position detection, an extremely reliable determination of the current rotary position is possible. Furthermore advantageously because of the contactless position detection, there is no complex wiring of the sensor units and rotary device preferably arranged on separate machine parts. Thus by analysis of the detected rotary position of the rotary device, any positioning faults occurring during the control of the separate machine parts can be compensated via a control and analysis unit, i.e. tolerances occurring during the angular detection can be compensated quickly and easily.

Particularly advantageously the sensor unit is formed as an electro-optical or electromagnetic sensor unit. Optical sensor systems are extremely precise but susceptible to dirt, whereas magnetic sensor systems are very robust and not sensitive to dirt. For this the rotary device has scaling means rotating about the rotary axis which can be detected contactless via the sensor unit concerned.

According to the invention the rotary position D of the rotary device 4 is detected via a sensor unit 5 working contactless. The rotary position D of the rotary device 4 is given preferably in the form of an angle amount in relation to a reference rotation position DR, in each case in relation to a rotary movement about the axis of rotation DA.

Advantageously the sensor unit 5 is formed as an electro-optical or electromagnetic sensor unit which cooperates with scaling means 6 connected with the rotary device 4. Here the scaling means 6 are arranged preferably on the casing surface of the rotary device 4 rotating about the rotational axis DA, i.e. the scaling means 6 themselves rotate about rotary axis DA such that these can be detected contactless via the sensor unit 5. To indicate different rotary positions D of the rotary device 4, the scaling means 6 have several measuring marks 6.1 preferably provided at regular intervals.

In a preferred embodiment, the rotary device 4 is formed by a turntable element which can be driven about rotary axis DA via a drive unit not shown in the figures, wherein the drive unit is preferably controlled via the control and analysis unit SA. The turntable element 4 has a substantially cylindrical base body which comprises a cylinder casing surface 4.1 running concentric to the rotary axis DA.

According to the embodiment example shown in FIGS. 1 to 5, the sensor unit 5 and the turntable element 4 are arranged approximately in a common plane running perpendicular to rotary axis DA so that via the sensor unit 5, the cylinder casing surface 4.1 of the turntable element 4 can be detected contactless. To determine the rotary position D of the turntable element 4 via the contactless sensor unit 5, scaling means 6 are arranged on the cylinder casing surface 4.1 of the turntable element 4.

The respective sensor for contactless detection of marking 1.1 at the respective bottle 1 is indicated diagrammatically in FIG. 1 by S. In addition to this, a sensor system is provided for contactless detection of rotary or angular position of the bottle clamping element concerned, namely the respective clamping fork 11 and with it the respective bottle 1 after delivery to a receiver 14 of the transport elements 5, 6 and 7. This sensor system, in the manner described in more detail below in connection with FIGS. 15 to 17, comprises at least incremental emitter or encoding rings ER at each bottle clamping element or at each clamping fork 11 or at an element of the respective holding and centering unit 9 which also rotates about axis AS on rotation of the bottle clamping element. The encoder rings ER are part of the holding and centering unit 9 and move with this. The encoder rings ER can be scanned, preferably contactless, by sensor units provided for example on the transport elements 5, 6 and 7 or the receivers there. The encoder rings ER together with the sensor units scanning these form "open" encoders or incremental emitters. The term "encoder ring" in the sense of the invention refers in general to an arrangement of markings or measuring marks which can be scanned, preferably contactless, and arranged about a rotary or swivel axis of function elements i.e. for example about the respective axis AS of the container or bottle clamping element, the angular or rotary position of which is to be detected, on at least one ring surrounding this axis at least partly concentrically.

It has been assumed above that each holding and centering unit 9 has its own servomotor 12. FIGS. 4 and 5 as a further embodiment show a device 2a in which the bottles 1 are also each held by a holding and centering unit 9 at the container inlet 3 and are moved on the same holding and centering unit 9 through the device 2a to the end of the container outlet 4 and only there released by the holding and centering unit 9 which then in turn is moved back via the transport system 13 to the container inlet 3. Each bottle 1 thus remains connected with one and the same holding and centering unit 9 throughout the entire process. The device 2a differs from the device 2 however in that the servomotors 12a corresponding to servomotors 12 are not provided fixedly on the holding and centering elements 9 but the transport elements 5, 6 and 7 have servomotors 12a, wherein the number of servomotors 12a is approximately equal to the number of receivers 14 of the respective transport element 5, 6 and 7.

The servomotors 12a can be moved for example with an auxiliary conveyor not shown such that on docking and/or delivery of a holding and centering unit 9 at a receiver 14 of a transport element 5, 6 or 7, a servomotor 12a of the respective transport element is coupled to the holding and centering unit 9 or the clamping fork 11 there and the respective servomotor 12a, before reaching the delivery position 15 or before reaching the delivery position 16 between transport element 7 and the container outlet 4, is decoupled from the holding and centering unit 9 and to avoid a collision with the servomotors 12a, moved out of the pitch circle of the receivers 14 and in synchrony with the rotational movement of the transport element 5, 5a or 7, returned to the delivery position 17 between the container inlet 3 and the transport element 5 or the delivery position 15 as indicated with line 18.

FIGS. 7 and 8 as a further embodiment show a device 2b which differs from the device 2a essentially only in that the servomotors 12b there, to avoid a collision and after decoupling from the respective holding and centering unit 9, are swivelled away from their associated receiver 14 and in the embodiment shown each about a swivel axis oriented tangential to the rotary motion of the transport element 5, 6 and 7 concerned.

Figure 9:
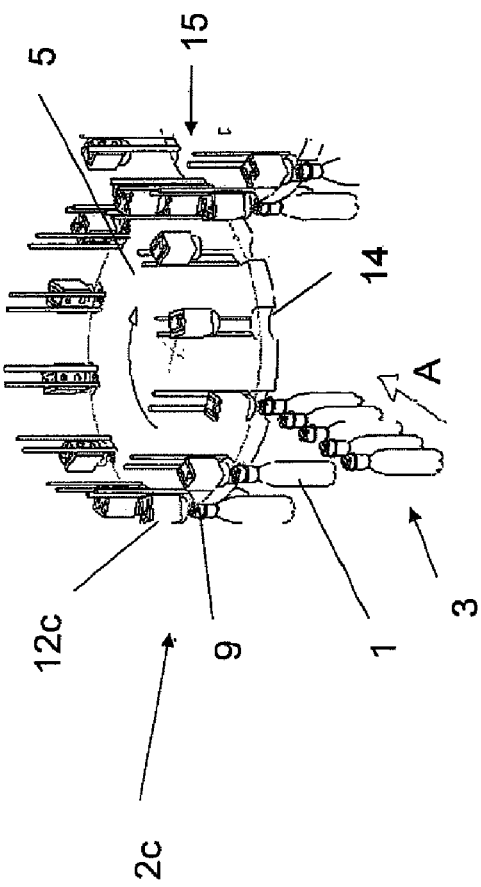

FIGS. 9 and 10 as further embodiments show a device 2c which differs from the device 2a in that the servomotors designated 12c there, after decoupling from the holding and centering unit 9, to avoid collisions are raised in the vertical direction i.e. in the direction parallel to the rotary axis of the transport elements 5, 6 and 7, namely to different heights at adjacent transport elements.

FIGS. 11 and 12 show as further embodiments a device 2d which differs from the devices 2, 2a and 2c in that the transport elements 5, 6 and 7 are not directly adjacent but between the transport elements are arranged intermediate conveyors 19 for example in the form of rails, transport chains etc., on which the holding and centering elements 9 are held or guided aligned with their housings. The container inlet 3 and the container outlet 4 in these embodiments are designed similar to these intermediate conveyors 19.

In the device 2d, each bottle 1 remains connected with one and the same holding and centering unit throughout the entire process which is carried out in several part steps at transport elements 5, 6 and 7 i.e. at different sections or parts of the device-internal transport system. In device 2d the servomotors 12d are provided at transport elements 5, 6 and 7, wherein one servomotor 12d is allocated to each receiver 14 and is coupled to the respective holding and centering unit delivered or docked at a receiver 14. Due to the intermediate conveyors 19, there is no need to move out the servomotors 12a to avoid a collision.

In the devices 2, 2a-2e, the sensors detecting the markings or reference marks 1.1 are provided for example at the holding and centering elements 9 and/or at the transport elements 5, 6 and 7.

FIGS. 14-15 show a device 2e in which instead of the servomotors 12, 12a-12d, "open" servomotors 12e are used. For this the holding and centering elements 9 are each designed with a servomotor rotor 20 which at least for drive is firmly connected with the respective bottle clamping element in the form of clamping fork 11. Allocated to the rotors 20 at which the respective encoder ring ER is provided are stators 21 at the receivers 24 of the transport elements 5, 6 and 7 of device 2e so that after delivery of a holding and centering unit 9 or the associated rotor 20 at a receiver 24, the rotor 20 with the stator 21 provided in the receiver forms an electric servomotor 12e with which the respective bottle 1 held at the holding and centering unit 9 can be swivelled and rotated about its bottle axis for alignment and during treatment, again taking into account the marking or reference mark 1.1 detected by the sensors of the electric control device. The sensors detecting the reference marks 1.1 in device 2e are for example provided at the transport elements 5, 6 and 7 or at the receivers 24 there.

In device 2e also, each bottle 1 is connected with one and the same holding and centering element 9 throughout the entire process carried out in several process steps at different transport elements 5, 6 and 7 of the device-internal transport system. By corresponding control of the stators 21, in particular on delivery from one transport element to the next transport element, in principle there is no need for re-alignment of the bottles 1 after delivery from one transport element to the next transport element. In each case the stators 21 are controlled such that during delivery only one stator 21 is activated.

FIG. 16 shows in positions a-c further embodiments of the holding and centering elements 9a, 9b and 9c which can be used instead of the holding and centering elements 9.

The holding and centering unit 9a in turn consists of a housing 10 in which instead of the gripper or the clamping fork 11, as a bottle clamping element a centering and clamping cone 22 is provided which, using the respective servomotor to align the bottle 1, is arranged in housing 10 rotatable or swivelable about the axis AS. Allocated to the holding and centering unit 9a is a container carrier 23 which in this embodiment is formed by a container plate on which the bottle 1 stands with its base 1.3 and is held centred there in relation to axis AS with form fit by corresponding shaping of the container carrier 23. By a corresponding axial feed movement of the holding and centering unit 9a and/or container carrier 23, the respective bottle 1 is clamped between the holding and centering cone 22, protruding into the bottle opening 1.2 and centering the bottle 1 there, and the container carrier 23 rotatable about axis AS for alignment and rotation during handling. The rotary movement of the bottle 1 takes place by friction via the clamping and centering cone 22 and the bottle opening 1.2. In principle however it is possible to transmit the rotary and swivel movement by a form fit connection, for example by a servomotor which acts on the container carrier 23. In this embodiment an encoder ring ER is provided on the centering cone 22 or on an element or section 22.1 connected for drive with the centering cone 22. A further encoder ring ER is located on the container carrier 23 or on an element connected for drive with this container carrier 23.

In the holding and centering unit 9b, the container carrier 24 forming the bottle clamping element or counter bearing is integrated in the holding and centering unit 9b, for cooperation with the container flange 1.4 (neck ring) formed in the area of the bottle mouth. The rotary or swivel movement to align and rotate the bottle 1 is transferred in this embodiment again by friction or force fit. In this embodiment the encoder ring ER is provided on the container carrier 24 or on an element or section 24.1 connected for drive with the container carrier 24.

The centering and clamping unit 9c differs from the centering and clamping unit 9a first in that the clamping and centering cone 22 with its cone axis is arranged eccentric to axis AS and that instead of the container carrier 23, a container carrier 25 is provided which with the bottle 1 clamped between the holding and centering unit 9c and the container carrier 25, locally lies substantially against the centre area of the bottle base 1.3. The bottle 1.1 is shown excessively deformed in the depiction in position c). With the holding and centering unit 9c and associated container carrier 25, which again for example is freely rotatable about axis AS, a reforming of the deformed bottle 1 is possible by rotating or swivelling the holding and centering cone 22 about axis AS such that the casing surface of the bottle 1 on later treatment has optimum parallelity to the respective treatment station or printing head 8, i.e. the bottle 1 is aligned for optimum roundness of running in relation to the rotation axis resulting from the deformed casing surface. The alignment of the bottles 1 in relation to the reference mark or marking 1.1, and the rotation of the bottles 1 in this embodiment take place by rotating or swivelling the housing 10 about axis AS. Instead of the clamping and centering cone 22, other elements which can be moved eccentric to axis AS are provided for clamping and reforming deformed bottles 1. In this embodiment the encoder ring ER is again provided on the section 22.1 connected at least for drive with the clamping and centering cone 22.

A quite essential aspect of the device according to the invention lies in that the sensor means are formed preferably for contactless detection and/or control of the rotary or angular position and for this the corresponding encoder rings ER are held at the bottle clamping elements on which the bottles 1 are held constantly during transport from the container inlet 3 to the container outlet 4, or at elements or sections rotating with these bottle clamping elements. Due to the contactless detection of the rotary or angular position, an extremely reliable determination of the precise angular or rotary position of the bottles 1 is possible. Furthermore because of the contactless position detection there is no need for complex cabling of the components of the sensor system arranged on separate machine elements, which system can also be formed as an "open" system in the manner described above. By evaluation of the detected angular or rotary position of the bottle clamping elements (clamping fork 11, clamping and centering cone 22, container carrier 23), any positioning faults occurring during control can be compensated via a control and analysis unit or electronics i.e. tolerances occurring during angle detection can be compensated quickly and easily. Because the encoder rings ER are each provided at the bottle clamping elements or rotate with these and the bottles 1 are constantly held on one and the same bottle clamping element or on one and the same holding and centering unit 9, 9a-9c over the entire transport path between the container inlet 3 and container outlet 4, by scanning the encoder rings ER a precise detection of the angular or rotary position of each bottle 1 is possible in relation to the bottle features typical of the bottle form and/or in relation to the marking 1.1.

Particularly advantageously the sensor system is formed as an electro-optical or electromagnetic sensor system. Electro-optical sensor systems are extremely precise but susceptible to fault due to soiling, whereas magnetic sensor systems are extremely robust and not sensitive to dirt.

As shown in FIG. 17, each encoder ring ER has a scaling 27 which surrounds the axis AS in a circular ring shape and can be detected contactless by sensor unit 26, for example on a circle cylinder surface surrounding axis AS concentrically. Detection of the angular or rotary position D of the encoder ring ER and hence the bottle clamping element comprising this encoder ring takes place via the sensor unit 26 working contactless, preferably in the form of an angular amount of rotary movement about axis AS in relation to a reference angle position or reference rotary position DR.

Sensor unit 26 and encoder ER are arranged, after docking of the respective holding and centering unit 9, 9a-9c, on a receiver 14, at least approximately in a common plane oriented vertical to axis AS so that the sensor unit 26 can detect the scaling 27 provided on the circular cylindrical surface of the encoder ER. Evidently other arrangements of the scaling 27 on the encoder ring ER are possible, for example on a cone surface surrounding axis AS concentrically or on a ring surface surrounding axis AS and oriented in a plane perpendicular to this axis, wherein then the sensor element is arranged accordingly opposite the scaling.

Advantageously the sensor unit 26 is an electro-optical or electromagnetic sensor unit 26.1 which cooperates with the scaling 27.1 formed suitably for this unit, which scaling for display of different rotary positions D of the respective encoder ring ER has several markings or measuring marks 27.1 preferably provided at even angular distances (FIG. 18). Controlled by the measuring signal ms supplied by the respective sensor element 26.1 and the reference signal msf, via a control and analysis electronic unit 28 which is formed for example by a central control computer in respective device 2, 2a-2e, a controlled alignment of the bottle 1 takes place by rotating the bottle clamping element about axis AS by means of servomotor 12, 12a-12d.

To detect the rotary or angular position D of the encoder ring ER, an electro-optical sender unit 26.1.1 which in the simplest case is formed by an LED or laser diode generates optical signal os in the form of at least one light beam directed at the scaling 27.1 or at the reflective measurement marks 27.1.1 there. At the measurement mark 27.1.1 the optical signal os is reflected at least in sections and thus with a rotating encoder ring ER, a preferably pulsed optical signal os' is generated which is detected by at least one optical receiver unit 26.1.2. The reflected optical signal os' detected via the optical receiver unit 26.1.2 is passed to an optical receiver unit 26.1.2 and evaluated in this to generate the electrical measurement signal ms and the reference signal msf. Both signals are transmitted to the control and analysis unit 28 or similar to control the respective servomotor 12, 12a-12d.

FIG. 19 shows as a further possible embodiment an encoder ring ER together with a sensor unit which is formed as an electromagnetic unit 26.2 and which has at least one magneto-resistive sensor electronic unit 26.2.1, i.e. a sensor electronic unit 26.2.1 responding to a magnetic field and/or a magnetic field change. The encoder ring ER which rotates with the bottle clamping elements i.e. with the clamping forks 11, rotors 20, clamping and centering cones 22 and container carriers 23, has a scaling 27.2 which is formed by a magnetic field which changes in field strength along scaling 27.2. For this the respective encoder ring ER is preferably designed with a magnetic carrier layer surrounding the axis AS in ring form and magnetised at regular intervals with magnetic north and south poles. These north and south poles then form the markings or measurement marks 27.2.1 of the encoder ring ER which are divided preferably concentrically about axis AS along a cylinder surface surrounding this axis concentrically. Here a change in rotary position D of the encoder ring ER by a pre-determined angular amount is allocated to each north and south pole, i.e. one north and south pole indicates a change in rotary position D of encoder ring ER by a pre-specified angular amount. To form a magnetic measurement strip, the magnetic carrier layer is preferably laminated onto a steel strip which is firmly connected with the circular cylindrical casing surface of the encoder ring ER. The magnetic carrier layer can be coated with a protective layer to protect against external mechanical influences.

To detect the rotary position D of encoder ring ER, the magneto-resistive sensor electronic unit 26.2.1 via at least one magneto-resistive sensor head provided for this scans the magnetic carrier layer contactless. In this way, in the magneto-resistive sensor electronic unit 26.2.1 at least the measurement signal ms is generated, where applicable also the reference measurement signal msf, for further processing in the control and analysis unit 28, namely to determine the current rotary position D of the encoder ring ER and hence the bottle 1 held at the associated bottle clamping element and as a function of this, to adjust precisely the alignment of the respective bottle 1 for treatment or for printing and for controlled rotary movement of the bottle 1 during treatment or printing.

Irrespective of the particular form of the sensor system, the common feature of all embodiments is that each encoder ring ER is fixedly provided at the respective bottle clamping element or respective holding and centering element 9, 9a, 9c and moves with this unit, whereas the sensor units 26, 26.1 or 26.2 are provided e.g. at the receivers 14 of the transport elements 5, 6 and 7, at least where a controlled alignment and/or rotation or swivelling of the bottles 1 is required.

It has been assumed above that the sensor units 26.1 and 26.2 each comprise only one sensor (opto-electrical receiver 26.1.2 or magneto-resistive sensor electronics 26.2.1) for contactless scanning of the respective scaling, and the encoder rings ER have only one scaling 27, 27.1 or 27.2. Evidently more complex sensor systems or sensor units are also conceivable, for example systems which comprise at least two sensors scanning, preferably contactless, a common or a respective separate scaling, in particular also in the form that these sensors supply phase-offset measurement signals which by corresponding processing allow not only a more precise determination of the transition between the individual measurement marks but also a precise determination of the current rotation direction of the respective encoder ring ER or bottle clamping element and bottle held at this.

The invention has been described above with reference to embodiment examples. Evidently numerous modifications and derivations are possible without leaving the inventive concept fundamental to the invention. Thus for example instead of the rotor or transport star-like transport elements 5, 6 and/or 7, other circulating transport elements succeeding each other in the transport direction can be used, for example with circulating belts and/or chains.

It has been assumed above that at each transport element 5, 6 and 7, one treatment of the bottle 1 takes place or one treatment step, i.e. printing of the bottle 1. In a simplified embodiment of the device according to the invention, in the preceding transport element each bottle 1 is pre-positioned for the next transport element. Here the angular signal is for example moved by a smaller angular amount, for example by an angular amount of approximately 5° before the next encoder. After delivery of the bottle 1 this is again brought into rotation, wherein by scanning the encoder ring ER, the actual position is supplied to the control and analysis electronic unit 28.

LIST OF REFERENCE NUMERALS

1 Bottle
1.1 Marking or reference mark
1.2 Bottle mouth
1.3 Bottle base
1.4 Opening flange or neck ring
2, 2a-2e Device for processing bottles 1
3 Container inlet
4 Container outlet
5, 6, 7 Transport element
8 Printing head
9, 9a 9c Clamping or holding and centering unit
10 Housing
11 Clamping fork
12, 12-12d Servomotor 13 Transport system for returning holding and centering elements
14 Receiver
15, 16, 17 Delivery position
18 Line
19 Intermediate conveyor
20 Rotor
21 Stator
22 Clamping and centering cone
23, 24, 25 Container carrier
26, 26.2, 26.2 Sensor element
26.1.1 Transmitter unit
26.1.2 Receiver unit
26.1.3 Analysis electronic unit
26.2.1 Magneto-resistive sensor electronic unit
27, 27.1, 27.2 Scaling
27.1.1 Reflective measurement mark
27.2.1 Magnetic measurement mark
28 Control and analysis electronic unit
A Transport direction at container inlet
B Transport direction at container outlet
AS Axis of clamping of holding and centering unit
D Rotary position
DR Reference position
ER Encoder ring
S Sensor for contactless detection of marking 1.1
os Optical signal
os' Reflected optical signal
ms Electric measuring signal
msf Reference signal

The invention claimed is:

1. An apparatus for carrying out a process for treating packaging means, said apparatus comprising: a device-internal transport system having at least two transport elements disposed in succession along a transport direction; holding-and-centering units for arranging said packaging means during a process step of said process in an orientation relative to said device-internal transport system that is necessary for said process step, said holding-and-centering units being independent of the transport elements and being passed between transport elements in a transport direction; whereby the same holding-and-centering unit holds the same packaging means throughout the process by a mouth portion thereof, wherein said packaging means comprises a container selected from the group consisting of a bottle and a can, said apparatus further comprising reference marks or markings on at least one of container clamping elements or elements rotating with said container clamping elements during alignment and rotation of said packaging means; and sensors for scanning said reference marks or markings to enable contactless control of one of servomotors or an electronic unit controlling said servomotors, said sensors being arranged on one or more structures selected from the group consisting of said holding-and-centering units, said transport elements forming device-internal transport systems, receivers, and processing stations.

2. The apparatus of claim 1, wherein the holding-and-centering units are configured for suspended holding of the packaging means.

3. The apparatus of claim 1, wherein the holding-and-centering units are configured for clamping the packaging means between a clamping piece lying against a top of the packaging means and a counter bearing.

4. The apparatus of claim 3, wherein the counter bearing comprises a packaging means carrier.

5. The apparatus of claim 3, wherein the clamping piece comprises a clamping cone.

6. The apparatus of claim 1, further comprising: a packaging means outlet to discharge the treated packaging means, and a packaging means inlet to receive the packaging means via a holding-and-centering unit that passes said packaging means to one of a transport element and said packaging means outlet.

7. The apparatus of claim 6, wherein the transport system is configured to return the holding-and-centering units from the packaging means outlet to the packaging means inlet.

8. The apparatus of claim 1, further comprising servomotors for controlled alignment and/or rotation and/or swiveling of the packaging means arranged or held at the holding-and-centering unit units.

9. The apparatus of claim 8, wherein each holding-and-centering unit is constantly connected to one of a servomotor or a function element thereof.

10. The apparatus of claim 9, wherein said function element comprises a rotor.

11. The apparatus of claim 1, further comprising first function elements provided at the transport elements and second function elements provided at the holding-and-centering units, wherein said first and second function elements form a servo motor.

12. The apparatus of claim 11, wherein at least one of said first function elements comprises a stator and at least one of said second function elements comprises a rotor.

13. The apparatus of claim 1, wherein said transport elements comprise receivers at which the holding-and-centering units can dock and from which the holding-and-centering units can be removed.

14. The apparatus of claim 1, further comprising servomotors provided at corresponding transport elements forming the device-internal transport system, said servomotors configured to couple with corresponding holding-and-centering units for alignment and treatment of the packaging means, said servomotors remaining, in use, at their corresponding transport elements.

15. The apparatus of claim 14, further comprising control means associated with a first transport element for moving a servomotor associated with said first transport element along a transport direction by at least one delivery area out of a movement path of servomotors in a directly adjacent preceding or succeeding transport element.

16. The apparatus of claim 14, further comprising means for controlling said servomotors or controlling an electronic component controlling said servomotors; and sensors for detecting markings or reference marks on said packaging means to control said servomotors or an electronic unit controlling said servomotors, said sensors being provided on one or more structures selected from the group consisting of: said holding-and-centering units, said transport elements forming said device-internal transport systems, receivers; and processing stations.

17. The apparatus of claim 1, wherein the transport elements are, at least at one delivery area, adjacent to each other.

18. The apparatus of claim 17, wherein the adjacent transport elements are indirectly adjacent to each other via an intermediate transport element.

19. The apparatus of claim 17, wherein the intermediate transport element comprises a linear transport section.

20. The apparatus of claim 1, wherein the transport elements comprise transport stars.

21. The apparatus of claim 1, wherein the transport elements comprise a rotor.

22. The apparatus of claim 1, further comprising printing machines or print heads, each of which is configured for application of a color set for a multicolor printing image.

23. The apparatus of claim 1, wherein said sensor units are selected from the group consisting of opto-electrical and magnetic sensors.

* * * * *